United States Patent
Takano et al.

(10) Patent No.: US 11,203,358 B2
(45) Date of Patent: Dec. 21, 2021

(54) VEHICLE CONTROL APPARATUS

(71) Applicant: Honda Motor Co., Ltd., Tokyo (JP)

(72) Inventors: Shogo Takano, Wako (JP); Kota Saito, Wako (JP); Takashi Adachi, Wako (JP); Chao Niu, Wako (JP); Masakatsu Hori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 219 days.

(21) Appl. No.: 16/448,697

(22) Filed: Jun. 21, 2019

(65) Prior Publication Data

US 2020/0001891 A1 Jan. 2, 2020

(30) Foreign Application Priority Data

Jun. 28, 2018 (JP) .............................. JP2018-122737

(51) Int. Cl.
*B60W 50/10* (2012.01)
*B60W 10/20* (2006.01)
(Continued)

(52) U.S. Cl.
CPC ............ *B60W 50/10* (2013.01); *B60W 10/04* (2013.01); *B60W 10/20* (2013.01); *B60W 30/18* (2013.01);
(Continued)

(58) Field of Classification Search
CPC ...... B60W 50/10; B60W 10/20; B60W 10/04; B60W 30/18; B60W 2540/18;
(Continued)

(56) References Cited

U.S. PATENT DOCUMENTS

| | | | | |
|---|---|---|---|---|
| 2002/0033293 A1* | 3/2002 | Fukuda | ............. | B60K 23/0808 180/250 |
| 2005/0004732 A1* | 1/2005 | Berry | ................. | B60W 50/045 701/48 |
| 2010/0125019 A1* | 5/2010 | Tabata | ................ | B60W 10/115 477/3 |

FOREIGN PATENT DOCUMENTS

| | | |
|---|---|---|
| JP | S63154428 A | 6/1988 |
| JP | 2016159781 A | 9/2016 |

(Continued)

OTHER PUBLICATIONS

Japanese Office action; Application 2018122737; dated Oct. 5, 2021.

*Primary Examiner* — Nga X Nguyen
(74) *Attorney, Agent, or Firm* — Duft & Bornsen, PC (57) ABSTRACT

A vehicle control apparatus including a driving force generation unit, a driving force distribution mechanism distributing a driving force from the driving force generation unit to a front wheel and a rear wheel, and an electronic control unit having a microprocessor and a memory. The microprocessor is configured to perform: determining whether a mode switching instruction from self-drive mode enabling a self-drive function to manual drive mode disabling the self-drive function has been input; and controlling the driving force distribution mechanism so that a driving force distribution rate of rear wheel driving force relative to front wheel driving force is a first distribution rate during driving in the self-drive mode, and thereafter so that the driving force distribution rate is a second distribution rate greater than the first distribution rate when it is determined that the mode switching instruction has been input.

20 Claims, 6 Drawing Sheets (51) Int. Cl.
    *B60W 10/04*       (2006.01)
    *B60W 30/18*       (2012.01)
    *G05D 1/00*        (2006.01)
    *B60W 50/00*       (2006.01)

(52) U.S. Cl.
    CPC ... *G05D 1/0088* (2013.01); *B60W 2050/0073* (2013.01); *B60W 2540/18* (2013.01); *B60W 2710/20* (2013.01); *B60W 2720/106* (2013.01); *G05D 2201/0213* (2013.01)

(58) Field of Classification Search
    CPC ....... B60W 2710/20; B60W 2720/106; B60W 2050/0073; B60W 2556/50; B60W 2540/10; B60W 2540/12; B60W 50/00; B60W 2720/403; B60W 2050/007; B60W 30/182; B60W 2520/40; G05D 1/0088; G05D 2201/0213
    See application file for complete search history.

(56) References Cited

FOREIGN PATENT DOCUMENTS

| | | |
|---|---|---|
| JP | 2016178840 A | 10/2016 |
| JP | 2018088060 A | 6/2018 |

\* cited by examiner

VEHICLE CONTROL APPARATUS

CROSS-REFERENCE TO RELATED APPLICATION

This application is based upon and claims the benefit of priority from Japanese Patent Application No. 2018-122737 filed on Jun. 28, 2018, the content of which is incorporated herein by reference.

BACKGROUND OF THE INVENTION

Field of the Invention

This invention relates to a vehicle control system configured to control a vehicle capable of switching a drive mode between a manual drive mode and a self-drive mode.

Description of the Related Art

Conventionally, there is a known apparatus of this type, in which drive mode is switched from self-drive mode to manual drive mode in accordance with steering torque generated from operation of steering wheel by a driver. Such an apparatus is described in Japanese Unexamined Patent Publication No. 2016-159781 (JP2016-159781A), for example. The apparatus of JP2016-159781A, when steering torque becomes greater than a predetermined value during traveling in self-drive mode, determines that override condition is satisfied, and thus switches drive mode to manual drive mode.

However, in a situation where drive mode is switched to manual drive mode by satisfaction of override condition, as the apparatus of JP2016-159781A, vehicle cornering resistance increases. Therefore, since deceleration immediately after switching to manual mode increases, the driver feels quite unnatural.

SUMMARY OF THE INVENTION

An aspect of the present invention is a vehicle control apparatus, including: a driving force generation unit configured to generate a driving force used for traveling; a driving force distribution mechanism configured to distribute the driving force from the driving force generation unit to a front wheel and a rear wheel; and an electronic control unit having a microprocessor and a memory. The microprocessor is configured to perform: determining whether a mode switching instruction from a self-drive mode enabling a self-drive function to a manual drive mode disabling the self-drive function has been input; and controlling the driving force distribution mechanism so that a driving force distribution rate defined as a value of a ratio of a driving force of the rear wheel relative to a driving force of the front wheel is a first distribution rate during driving in the self-drive mode, and thereafter so that the driving force distribution rate is a second distribution rate greater than the first distribution rate when it is determined that the mode switching instruction has been input.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention is explained with reference to FIGS. 1 to 6. A vehicle control apparatus according to the embodiment of the present invention is applied to a vehicle with a self-driving capability (self-driving vehicle). First, configurations of the vehicle are explained.

Figure 1:
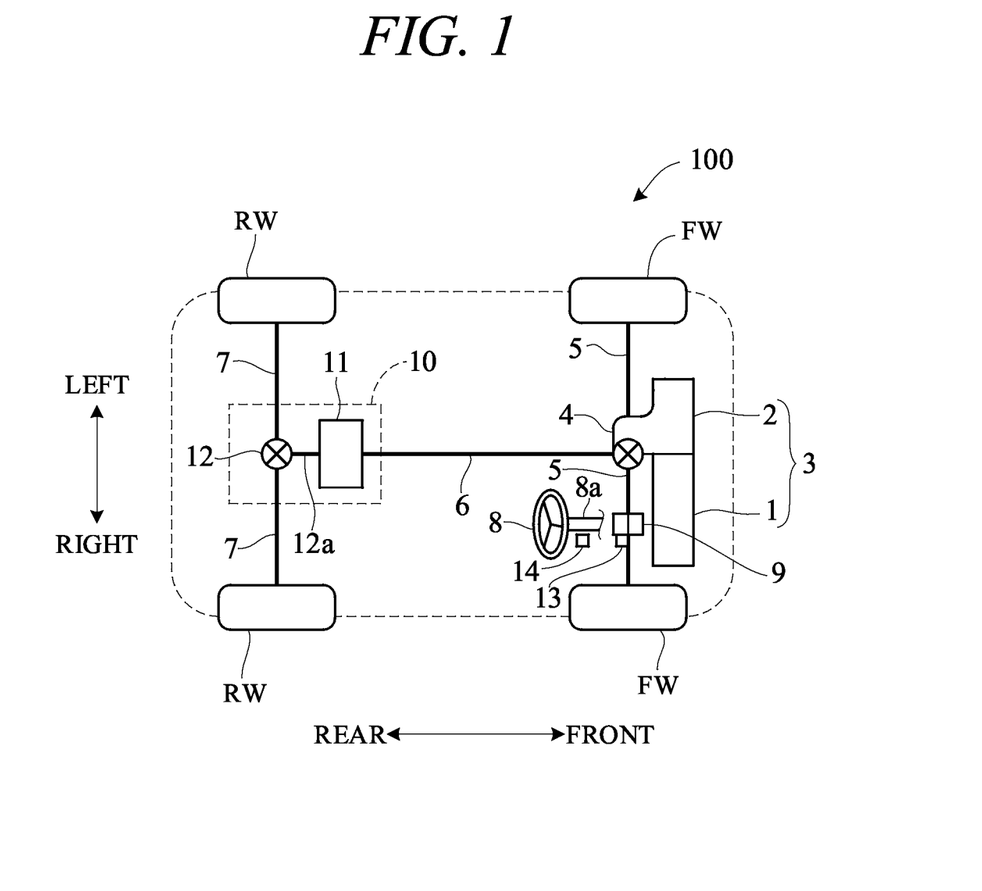
FIG. 1 is a diagram showing a configuration overview of a driving system of a self-driving vehicle incorporating a vehicle control apparatus according to an embodiment of the invention.

FIG. 1 is a diagram showing a configuration overview of a driving system of a self-driving vehicle 100 (also called simply "vehicle" or "subject vehicle") incorporating a vehicle control apparatus according to an embodiment of the present invention. The vehicle 100 is not limited to driving in a self-drive mode requiring no driver driving operations but is also capable of driving in a manual drive mode by driver operations. As shown in FIG. 1, the vehicle 100 is configured as a four-wheel drive vehicle having front drive wheels FW and rear drive wheels RW. An engine 1 and a transmission 2 are mounted on front side of the vehicle 100.

Figure 2:
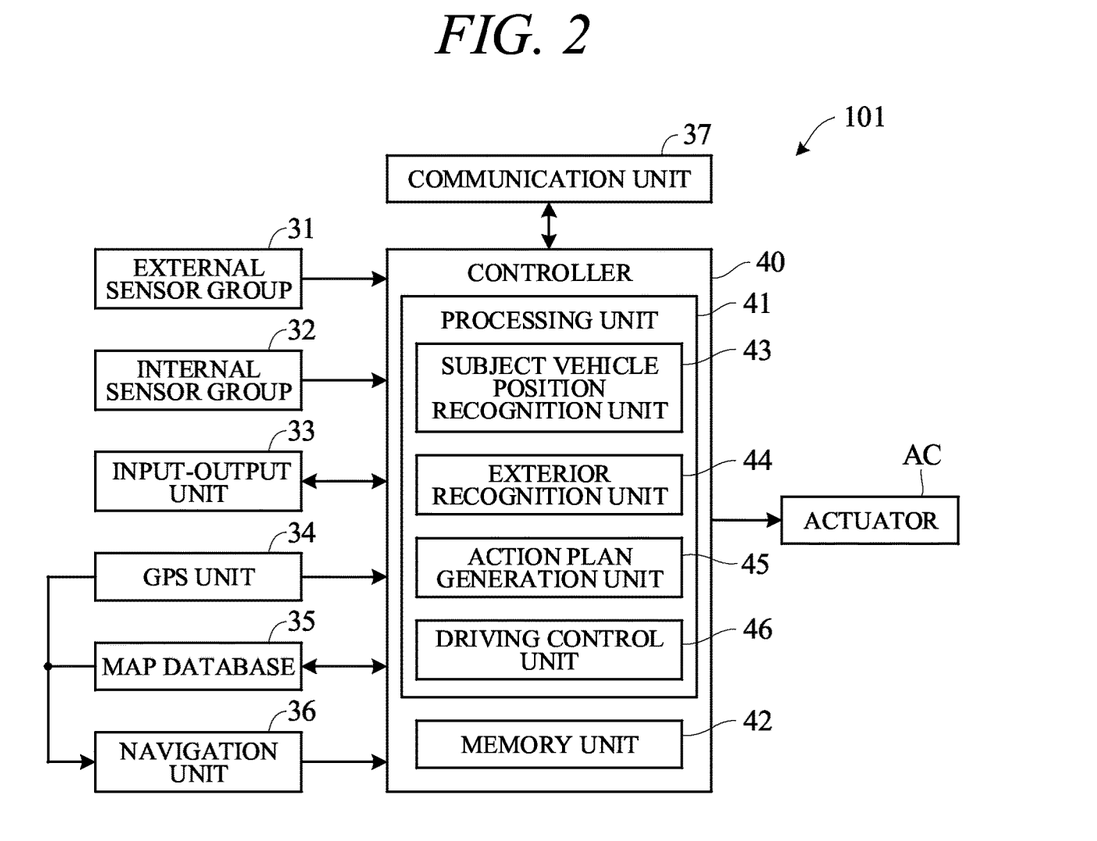
FIG. 2 is a block diagram schematically illustrating overall configuration of a vehicle control system controlling the self-driving vehicle of FIG. 1.

The engine 1 is an internal combustion engine (e.g., gasoline engine) wherein intake air supplied through a throttle valve and fuel injected from an injector are mixed at an appropriate ratio and thereafter ignited by a sparkplug or the like to burn explosively and thereby generate rotational power. A diesel engine or any of various other types of engine can be used instead of a gasoline engine. Air intake volume is metered by the throttle valve. An opening angle of the throttle valve (throttle opening angle) is changed by a throttle actuator operated by an electric signal. The opening angle of the throttle valve and an amount of fuel injected from the injector (injection timing and injection time) are controlled by a controller 40 (FIG. 2).

The transmission 2 is an automatic transmission which varies and outputs speed ratio of rotation of from the engine 1, and converts and outputs torque from the engine 1. The transmission 2 is, for example, a stepped transmission enabling stepwise speed ratio (gear ratio) shifting in accordance with multiple speed stages. Optionally, a continuously variable transmission enabling stepless speed ratio shifting can be used as the transmission 2. Although omitted in the drawings, power from the engine 1 can be input to the transmission 2 through a torque converter. The transmission 2 can, for example, incorporate a dog clutch, friction clutch or other engaging element. A hydraulic pressure control unit controls an oil flow to the engaging element from a hydraulic pressure source (such as oil pump) in accordance with instructions from the controller, whereby a speed stage of the transmission 2 can be changed to a target speed stage. The target speed stage is determined based on vehicle speed and required driving force, in accordance with a predetermined shift map.

The engine 1 and the transmission 2 configure a driving force generation unit 3 for generating a driving force (travel driving force). The driving force (torque) generated by the driving force generation unit 3 is transmitted to left and right front wheels FW through a front differential unit 4 and drive shafts 5. The driving force generated by the driving force generation unit 3 can be also transmitted to left and right rear wheels RW through a propeller shaft 6 extending along front and rear direction, a rear differential unit 10 and drive shafts 7. Optionally, the vehicle 100 can be configured as an electric vehicle or hybrid vehicle by providing a drive motor (travel motor) in place of or in addition to the engine 1. In other words, the travel motor can be used as a driving force generation unit.

The differential unit 10 includes a driving force distribution mechanism 11 for distributing part of the travel driving force of the driving force generation unit 3 to the rear wheels RW and a differential mechanism 12 for distributing travel driving force distributed through the driving force distribution mechanism 11 to the left and right rear wheels RW. The driving force distribution mechanism 11 has a multi-plate wet electromagnetic clutch (electronically controlled coupling), for example, for coupling the propeller shaft 6 and an input shaft 12a of the differential mechanism 12. Engaging force of the electromagnetic clutch is controlled by a controller, whereby driving force distribution ratio between front wheel FW side and rear wheel RW side can be continuously (linearly) varied within range from 100:0 to 50:50.

A steering wheel 8 to be rotationally operated by a driver is installed at a driver's seat. One end portion of a steering shaft 8a is connected to the steering wheel 8 to rotate integrally with the steering wheel 8, and a steering gear box 9 of rack-and-pinion type, for example, is connected to another end portion of the steering shaft 8a. The rack of the steering gear box 9 moves laterally (left and right) in response to rotation of the steering wheel 8, thereby turning the front wheels FW leftward and rightward.

A turning actuator 13 is attached to the steering gear box 9. The turning actuator 13 is configured as an electric motor, for example. The turning actuator 13 can drive the rack of the steering gear box 9 left and right. This facilitates steering of the front wheels FW without the driver operating the steering wheel. A steering actuator 14 is attached to the steering shaft 8a. The steering actuator 14 is configured as an electric motor, for example. The steering actuator 14 drives the steering shaft 8a to apply reaction force in response to driver steering wheel manipulation. Reaction force applied by the steering actuator 14 in response to driver steering wheel manipulation is greater in proportion as amount of manipulation of the steering wheel 8 is greater, FIG. 2 is a block diagram schematically illustrating overall configuration of a vehicle control system 101 according to the present embodiment, and shows a configuration in relation to self-driving. As shown in FIG. 2, the vehicle control system 101 includes mainly the controller 40, and as members communicably connected with the controller 40 through CAN (Controller Area Network) communication or the like, an external sensor group 31, an internal sensor group 32, an input-output unit 33, a GPS unit 34, a map database 35, a navigation unit 36, a communication unit 37, and actuators AC for traveling.

The term external sensor group 31 herein is a collective designation encompassing multiple sensors (external sensors) for detecting external circumstances constituting vehicle ambience data. For example, the external sensor group 31 includes, inter alia, a LIDAR (Light Detection and Ranging) for measuring distance from the vehicle 100 to ambient obstacles by measuring scattered light produced by laser light radiated from the vehicle 100 in every direction, a RADAR (Radio Detection and Ranging) for detecting other vehicles and obstacles around the vehicle 100 by radiating electromagnetic waves and detecting reflected waves, and cameras having a CCD, CMOS or other image sensor and attached to the vehicle 100 for imaging ambience (forward, reward and sideways) of the vehicle 100.

The term internal sensor group 32 herein is a collective designation encompassing multiple sensors (internal sensors) for detecting driving state of the vehicle 100. For example, the internal sensor group 32 includes, inter alia, a vehicle speed sensor for detecting vehicle speed of the vehicle 100 and acceleration sensors for detecting forward-rearward direction acceleration and lateral acceleration of the vehicle 100, respectively, rotational speed sensor for detecting rotational speed of the engine 1, a yaw rate sensor for detecting rotation angle speed around a vertical axis through center of gravity of the vehicle 100, and a throttle opening angle sensor for detecting an opening angle of the throttle valve (throttle opening angle). The internal sensor group 32 also includes sensors for detecting driver driving operations in manual drive mode, including, for example, accelerator pedal operations, brake pedal operations, steering wheel 8 operations and the like.

The term input-output unit 33 is used herein as a collective designation encompassing apparatuses receiving instructions input by the driver and outputting information to the driver. The input-output unit 33 includes, inter alia, switches which the driver uses to input various instructions, a microphone which the driver uses to input voice instructions, a display for presenting information to the driver via displayed images, and a speaker for presenting information to the driver by voice. The switch of the input-output unit 33 includes a self/manual drive select switch for instructing a self-drive mode or manual drive mode.

The self/manual drive select switch, for example, is configured as a switch manually operable by the driver to output an instruction of switching to a self-drive mode enabling self-drive functions or a manual drive mode disabling self-drive functions in accordance with operation of the switch. Optionally, the self/manual drive select switch can be configured to instruct switching from manual drive mode to self-drive mode or from self-drive mode to manual drive mode without operating the self/manual drive select switch. For example, when a predetermined operation is made by a driver or a predetermined condition is satisfied, drive mode can be switched automatically to self-drive mode or manual drive mode.

For example, when an amount of manipulation of the accelerator pedal is greater than a predetermined amount, an amount of manipulation of the brake pedal is greater than a predetermined amount, or an amount of manipulation of the steering wheel 8 is greater than a predetermined amount during traveling in the self-drive mode, the controller 40 instructs to switch from self-drive mode to manual drive mode by determining to be an occurrence of override. Optionally, when driving instruction value to a predetermined actuator AC by manipulation of a driver is greater by a predetermined value than driving instruction value to the predetermined actuator AC during traveling in the self-drive mode, the controller may instructs to switch to manual drive mode by determining to be the occurrence of override.

The GPS unit 34 includes a GPS receiver (GPS sensor) for receiving position determination signals from multiple GPS satellites, and measures absolute position (latitude, longitude and the like) of the vehicle 100 based on the signals received from the GPS receiver.

The map database 35 is a unit storing general map data used by the navigation unit 36 and is, for example, implemented using a hard disk. The map data include road position data and road shape (curvature etc.) data, along with intersection and road branch position data. The map data stored in the map database 35 are different from high-accuracy map data stored in a memory unit 42 of the controller 40.

The navigation unit 36 retrieves target road routes to destinations input by the driver and performs guidance along selected target routes. Destination input and target route guidance is performed through the input-output unit 33. Destination can be automatically set not through the input-output unit 33. Target routes are computed based on current position of the vehicle 100 measured by the GPS unit 34 and map data stored in the map database 35.

The communication unit 37 communicates through networks including the Internet and other wireless communication networks to access servers (not shown in the drawings) to acquire map data, traffic data and the like, periodically or at arbitrary times. Acquired map data are output to the map database 35 and/or memory unit 42 to update their stored map data. Acquired traffic data include congestion data and traffic light data including, for instance, time to change from red light to green light.

The actuators AC are actuators for operating various devices in relation to vehicle traveling, i.e., for traveling of the vehicle 100. The actuators AC include a throttle actuator for adjusting opening angle of the throttle valve of the engine 1 (throttle opening angle), a shift actuator for changing speed stage of the transmission 2 by controlling oil flow to the engaging mechanism of the transmission 2, a brake actuator for operating a braking device, the turning actuator 13 for turning the front wheels, and a driving force distribution actuator for changing a driving force distribution rate to the front wheels FW and rear wheels RW.

The controller 40 is constituted by an electronic control unit (ECU). In FIG. 2, the controller 40 is integrally configured by consolidating multiple function-differentiated ECUs such as an engine control ECU, a transmission control ECU, a turning control ECU and so on. Optionally, these ECUs can be individually provided. The controller 40 incorporates a computer including a CPU or other processing unit (a microprocessor) 41 for executing a processing in relation to travel control, the memory unit (a memory) 42 of RAM, ROM, hard disk and the like, and an input-output interface or other peripheral circuits not shown in the drawings.

The memory unit 42 stores high-accuracy detailed map data including, inter alia, lane center position data and lane boundary line data. More specifically, road data, traffic regulation data, address data, facility data, telephone number data and the like are stored as map data. The road data include data identifying roads by type such as expressway, toll road and national highway, and data on, inter alia, number of road lanes, individual lane width, road gradient, road 3D coordinate position, lane curvature, lane merge and branch point positions, and road signs. The traffic regulation data include, inter alia, data on lanes subject to traffic restriction or closure owing to construction work and the like. The memory unit 42 also stores a shift map (shift chart) serving as a shift operation reference, various programs for performing processing, and threshold values used in the programs, etc.

As functional configurations in relation to mainly self-driving, the processing unit 41 includes a subject vehicle position recognition unit 43, an exterior recognition unit 44, an action plan generation unit 45, and a driving control unit 46.

The subject vehicle position recognition unit 43 recognizes map position of the vehicle 100 (subject vehicle position) based on subject vehicle position data calculated by the GPS unit 34 and map data stored in the map database 35. Optionally, the subject vehicle position can be recognized using map data (building shape data and the like) stored in the memory unit 42 and ambience data of the vehicle 100 detected by the external sensor group 31, whereby the subject vehicle position can be recognized with high accuracy. Optionally, when the subject vehicle position can be measured by sensors installed externally on the road or by the roadside, the subject vehicle position can be recognized with high accuracy by communicating with such sensors through the communication unit 37.

The exterior recognition unit 44 recognizes external circumstances around the vehicle 100 based on signals from cameras, LIDERs, RADARs and the like of the external sensor group 31. For example, it recognizes position, speed and acceleration of nearby vehicles (forward vehicle or rearward vehicle) driving in the vicinity of the vehicle 100, position of vehicles stopped or parked in the vicinity of the vehicle 100, and position and state of other objects. Other objects include traffic signs, traffic lights, road boundary and stop lines, buildings, guardrails, power poles, commercial signs, pedestrians, bicycles, and the like. Recognized states of other objects include, for example, traffic light color (red, green or yellow) and moving speed and direction of pedestrians and bicycles.

The action plan generation unit 45 generates a driving path (target path) of the vehicle 100 from present time point to a certain time ahead based on, for example, a target route computed by the navigation unit 36, subject vehicle position recognized by the subject vehicle position recognition unit 43, and external circumstances recognized by the exterior recognition unit 44. When multiple paths are available on the target route as target path candidates, the action plan generation unit 45 selects from among them the path that optimally satisfies legal compliance, safe efficient driving and other criteria, and defines the selected path as the target path. The action plan generation unit 45 then generates an action plan matched to the generated target path. An action plan is also called "travel plan".

The action plan includes action plan data set for every unit time $\Delta t$ (e.g., 0.1 sec) between present time point and a predetermined time period T (e.g., 5 sec) ahead, i.e., includes action plan data set in association with every unit time $\Delta t$ interval. The action plan data include position data of the vehicle 100 and vehicle state data for every unit time $\Delta t$. The position data are, for example, target point data indicating 2D coordinate position on road, and the vehicle state data are vehicle speed data indicating vehicle speed, direction data indicating direction of the vehicle 100, and the like. Action plan is updated every unit time $\Delta t$.

The action plan generation unit 45 generates the target path by connecting position data at every unit time $\Delta t$ between present time point and predetermined time period T ahead in time order. Further, the action plan generation unit 45 calculates acceleration (target acceleration) of sequential unit times $\Delta t$, based on vehicle speed (target vehicle speed)

corresponding to target point data of sequential unit times Δt on target path. In other words, the action plan generation unit 45 calculates target vehicle speed and target acceleration. Optionally, the driving control unit 46 can calculate target acceleration.

The driving control unit 46 controls the actuators AC in accordance with drive mode (self-drive mode, manual drive mode). For example, in self-drive mode, the driving control unit 46 controls the actuators AC to drive the vehicle 100 along a target path generated by the action plan generation unit 45. Namely, the driving control unit 46 controls the throttle actuator, shift actuator, brake actuator and steering actuator so that the vehicle 100 travels through the target points of the unit times Δt.

More specifically, in self-drive mode, the driving control unit 46 calculates required driving force for achieving the target accelerations at each unit time included in the action plan generated by the action plan generation unit 45, taking running resistance caused by road gradient and the like into account. And the actuators AC are feedback controlled to bring actual acceleration detected by the internal sensor group 32, for example, into coincidence with target acceleration. In other words, it controls the actuators AC so that the vehicle 100 travels at target vehicle speed and target acceleration. On the other hand, in manual drive mode, the driving control unit 46 controls the actuators AC in accordance with driving instructions by the driver (accelerator opening angle and the like) acquired from the internal sensor group 32.

The actuators AC also include a driving force distribution actuator (electromagnetic clutch or the like) for driving the driving force distribution mechanism 11. The driving control unit 46 outputs a control signal to the driving force distribution actuator in accordance with drive mode, and in self-drive mode, with a view to improving fuel efficiency, controls driving force distribution ratio between front wheel FW side and rear wheel RW side to, for example, 75:25. In other words, since in self-drive mode the vehicle 100 is to be driven with higher priority on fuel efficiency than on power performance, fuel economy is enhanced by increasing driving force on front wheel FW side to greater than driving force on rear wheel RW side. In manual drive mode, the driver can vary driving force distribution as desired such as by switch operation.

Figure 3:
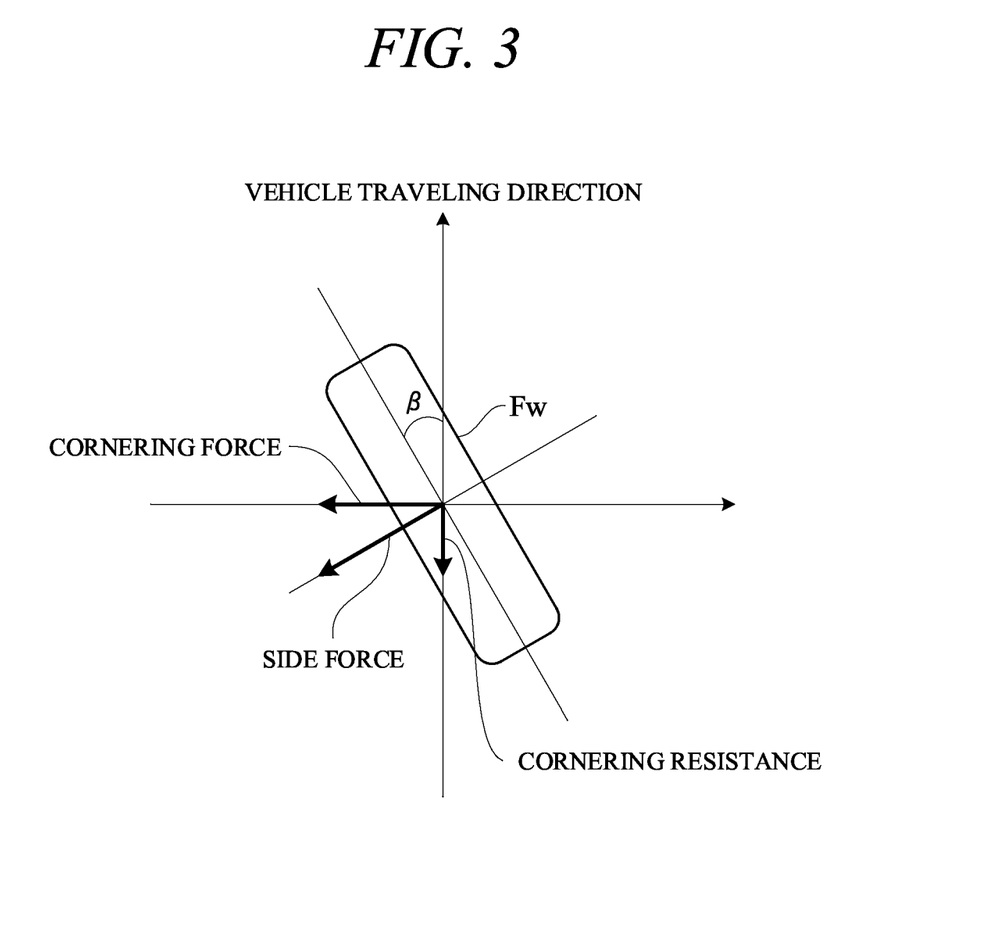
FIG. 3 is a diagram showing a front wheel model steered during traveling.

Of interest in this regard is that decelerating force acts on the vehicle when the front wheels FW are steered during vehicle traveling. FIG. 3 is a diagram showing a front wheel FW model for explaining the principle involved. In the example of FIG. 3, orientation of the front wheel FW is offset by angle β with respect to traveling direction of the vehicle 100. Angle β is known as slip angle. Slip angle β can be calculated based on steering angle. When slip angle θ is present as indicated in FIG. 3, tire side force acts along the rotational axis of the front wheel FW. Components of the side force consist of cornering force perpendicular to vehicle traveling direction and cornering resistance opposite to vehicle traveling direction. Occurrence of cornering resistance opposite to vehicle traveling direction decelerates the vehicle 100. Cornering resistance varies with slip angle β and can be calculated from slip angle β.

Vehicle decelerating force (cornering force) thus acts on the vehicle when the front wheels FW are turned. When the vehicle is traveling in self-drive mode, therefore, the driving control unit 46 calculates cornering resistance and controls the actuators AC (one or more of throttle actuator, shift actuator and the like) so that the driving force generation unit 3 increases travel driving force in accordance with the calculated cornering resistance. Since this minimizes deceleration during cornering, constant or nearly constant vehicle speed cornering can be achieved.

On the other hand, when the vehicle is traveling in self-drive mode, it sometimes happens that the driver needs to override self-drive mode and implement manual drive mode solely by operating the steering wheel 8, so as, for example, to avoid an obstacle in front of the vehicle 100 or turn the vehicle 100 more rapidly than when traveling in self-drive mode. The sharp deceleration of the vehicle 100 caused by cornering resistance in such a situation feels quite unnatural to the driver. Particularly when front wheel FW driving force is in a region near tire friction circle limit when ascending a snow-covered or other low-μ road, driver steering override is apt to cause driving force to deviate from the friction circle limit and prevent turning of the vehicle as desired by the driver. The vehicle control apparatus of the present embodiment is therefore configured with attention to this point as set out in the following.

Figure 4:
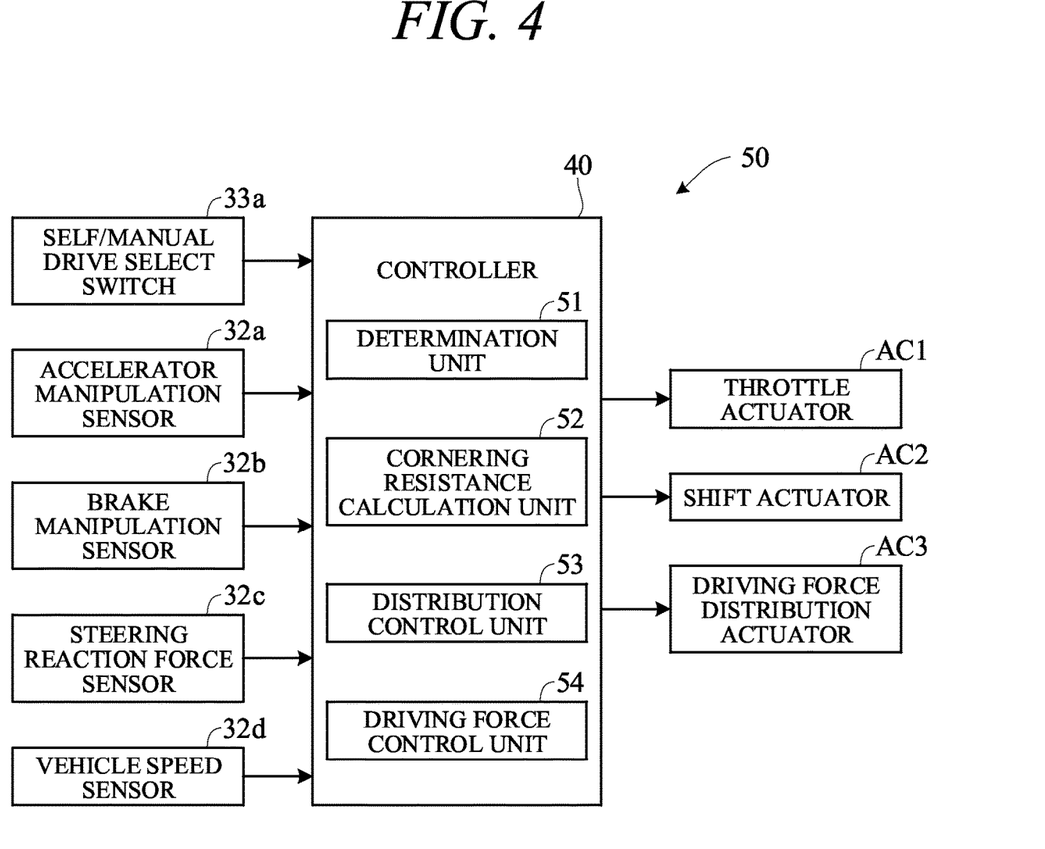
FIG. 4 is a block diagram illustrating main configuration of the vehicle control apparatus according to the embodiment of the invention.

FIG. 4 is a block diagram showing main components of a vehicle control apparatus 50 in accordance with the present embodiment. This vehicle control apparatus 50 is a unit for controlling driving actions of the vehicle 100 and is configured as part of the vehicle control system 101 of FIG. 2.

As shown in FIG. 4, the vehicle control apparatus 50 includes the controller 40 and, connected thereto, a self/manual drive select switch 33a, accelerator manipulation sensor 32a, brake manipulation sensor 32b, steering reaction force sensor 32c, vehicle speed sensor 32d, throttle actuator AC1, shift actuator AC2, and driving force distribution actuator AC3.

The accelerator manipulation sensor 32a is a detector for detecting driver manipulation (depression) of the accelerator pedal and is a member of the internal sensor group 32 of FIG. 2. The brake manipulation sensor 32b is a detector for detecting driver manipulation (depression) of the brake pedal and is a member of the internal sensor group 32. The steering reaction force sensor 32c is a detector for detecting reaction force applied by the steering actuator 14 in response to manipulation (turning) of the steering wheel 8 and is a member of the internal sensor group 32. The vehicle speed sensor 32d is also a member of the internal sensor group 32.

The controller 40 has as functional configurations a determination unit 51, a cornering resistance calculation unit 52, a distribution control unit 53, and a driving force control unit 54. These units are, for example, configured as part of the driving control unit 46 of FIG. 2.

When the vehicle 100 is traveling in self-drive mode, the determination unit 51 uses a signal from the steering reaction force sensor 32c to determine whether a mode switching instruction to switch from self-drive mode to manual drive mode has been input in response to driver steering override. For example, the determination unit 51 determines that override is carried out when steering angle corresponding to magnitude of steering reaction force detected by the steering reaction force sensor 32c is equal to or greater than predetermined value. Optionally, whether override is carried out can be determined based not on reaction force magnitude but on whether reaction force rise rate (steer speed) is equal to or greater than predetermined value.

There is a correlation between steering angle and steering reaction force. The cornering resistance calculation unit 52 uses the correlation and a signal from the steering reaction force sensor 32c to calculate steering angle and calculates slip angle β (FIG. 3) based on this calculated steering angle and vehicle speed detected by the vehicle speed sensor 32d.

In addition, slip angle β is used to determine cornering resistance by means of a generally known arithmetic expression, map or the like.

The distribution control unit 53 controls distribution of driving force between the front wheels FW and rear wheels RW by outputting a control signal to the driving force distribution actuator AC3 (e.g., an electromagnetic clutch). In self-drive mode, the distribution control unit 53 controls the driving force distribution actuator AC3 to achieve distribution ratio of driving force between the front wheels FW and rear wheels RW suitable for improving fuel efficiency (e.g., 75:25). On the other hand, when the determination unit 51 determines input of an instruction to switch to manual drive mode, the distribution control unit 53 reduces distribution of driving force to the front wheels FW to predetermined ratio on condition of the accelerator manipulation sensor 32a detecting no manipulation of the accelerator pedal and the brake manipulation sensor 32b detecting no manipulation of the brake pedal. For example, the driving force distribution actuator AC3 is controlled to establish ratio of driving force distribution between the front wheels FW and rear wheels RW of 50:50.

Cornering resistance caused by front wheel FW turning varies with turning amount. When mode switching is instructed in response to driver steering override, the distribution control unit 53 reduces driving force distribution to the front wheels FW and increases driving force distribution to the rear wheels RW accordingly, thereby reducing tire load factor. Since this helps the vehicle 100 to corner efficiently, unnatural feeling to the driver when mode switching is instructed in response to driver steering override can be mitigated. And while distributing a high proportion of driving force to the front wheels FW when traveling on snow or similar is apt to cause driving force operating point with respect to tire friction circle to deviate from the friction circle and make the vehicle 100 incapable of turning, driving force operating point can be kept inside the friction circle and the vehicle 100 enabled to corner easily by limiting reduction of driving force to the front wheels FW until a driving force distribution ratio between the front wheels FW and the rear wheels RW reaches a ratio of 50:50. The driving force control unit 54 controls driving force generated by the driving force generation unit 3 by outputting a control signal to either the throttle actuator AC1 or the shift actuator AC2 (e.g., the throttle actuator AC1). In particular, when the determination unit 51 determines that a mode switching instruction to switch to manual drive mode has been input, the driving force control unit 54 controls the throttle actuator AC1, for example, so as to cover driving force for overcoming cornering resistance calculated by the cornering resistance calculation unit 52, on condition of the accelerator manipulation sensor 32a detecting no manipulation of the accelerator pedal and the brake manipulation sensor 32b detecting no manipulation of the brake pedal. Constant speed cornering can therefore be achieved when switching to manual drive mode is instructed in response to driver steering override.

Figure 5:
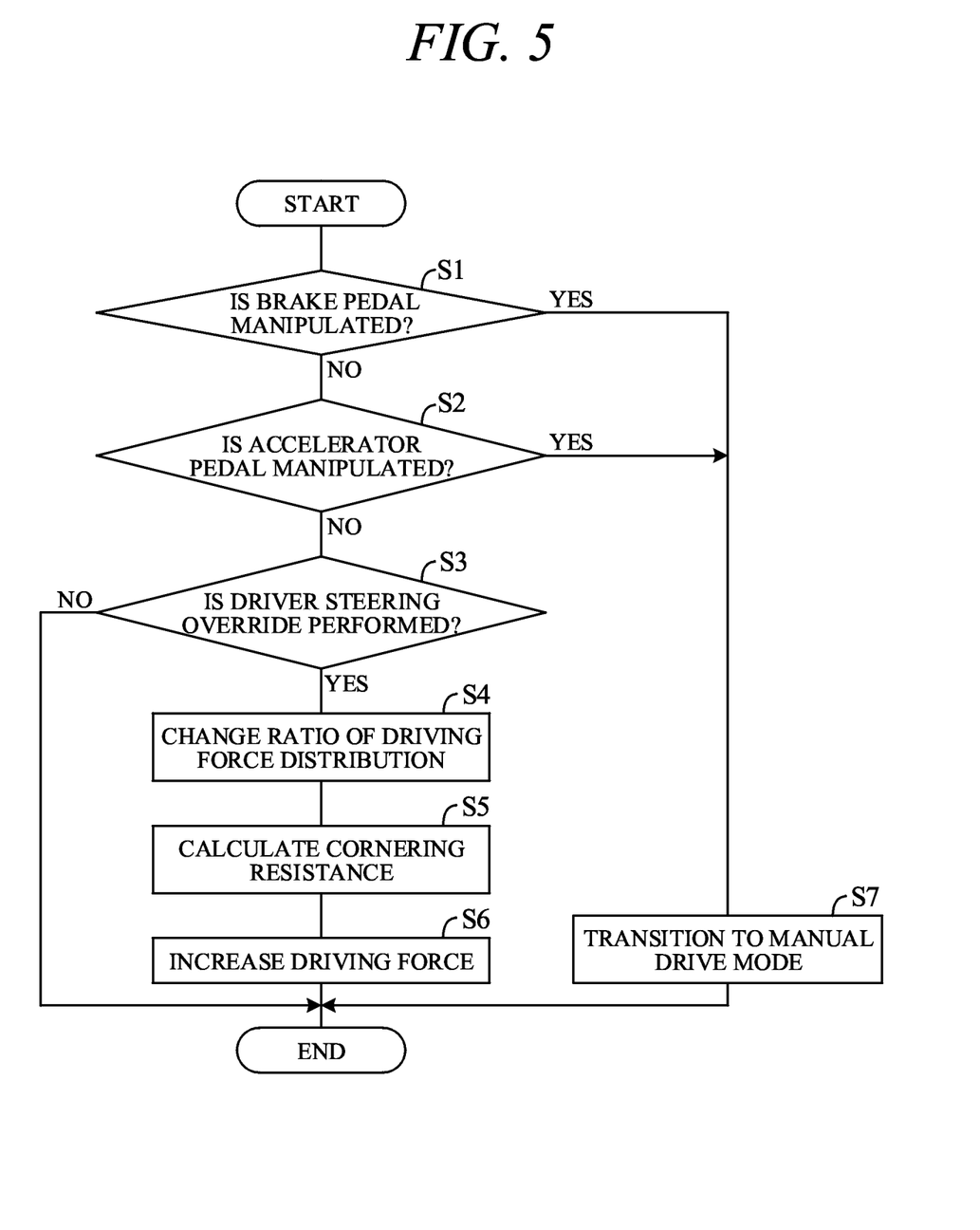
FIG. 5 is a flowchart showing an example of processing performed by a controller of FIG. 4.

FIG. 5 is a flowchart showing an example of processing performed by the CPU of the controller 40 of FIG. 4 in accordance with a program stored in the memory unit 42 in advance. The processing indicated in this flowchart is, for example, started upon input of a self-drive mode instruction through the self/manual drive select switch 33a and is repeatedly performed periodically at predetermined intervals. Initially, ratio of driving force distribution between front wheel FW side and rear wheel RW side is controlled to 75:25.

First, in S1 (S: processing Step), whether the brake pedal is manipulated (depressed) is determined based on a signal from the brake manipulation sensor 32b. If a negative decision is made in S1, the routine proceeds to S2, in which whether the accelerator pedal is manipulated (depressed) is determined based on a signal from the accelerator manipulation sensor 32a. If a negative decision is made in S2, the routine proceeds to S3 to determine whether driver steering override is performed. If a positive decision is made in S3, the routine proceeds to S4, and if a negative decision is made, the processing is terminated.

In S4, a control signal is output to the driving force distribution actuator AC3 to change ratio of driving force distribution between front wheel FW side and rear wheel RW side from 75:25 to 50:50. A value of ratio of rear wheel RW driving force relative to front wheel FW driving force is termed "driving force distribution rate". The processing of S4 therefore amounts to increasing driving force distribution rate from ⅓ (=25/75) to 1 (=50/50). Next, in S5, cornering resistance after changing driving force distribution is calculated based on signals from the steering reaction force sensor 32c and the vehicle speed sensor 32d. Next, in S6, a control signal is output to at least one of the throttle actuator AC1 and the shift actuator AC2 (e.g., the throttle actuator AC1) to increase driving force by an amount proportional to the cornering resistance calculated in S5. This increase in driving force is termed "correction driving force".

On the other hand, if a positive decision is made in S1 or S2, the routine proceeds to S7 to transition from self-drive mode to manual drive mode. In this case, correction driving force is gradually reduced to 0 and the driving control unit 46 (FIG. 2) controls the actuators AC in accordance with amounts of accelerator pedal and brake pedal manipulation.

Figure 6:
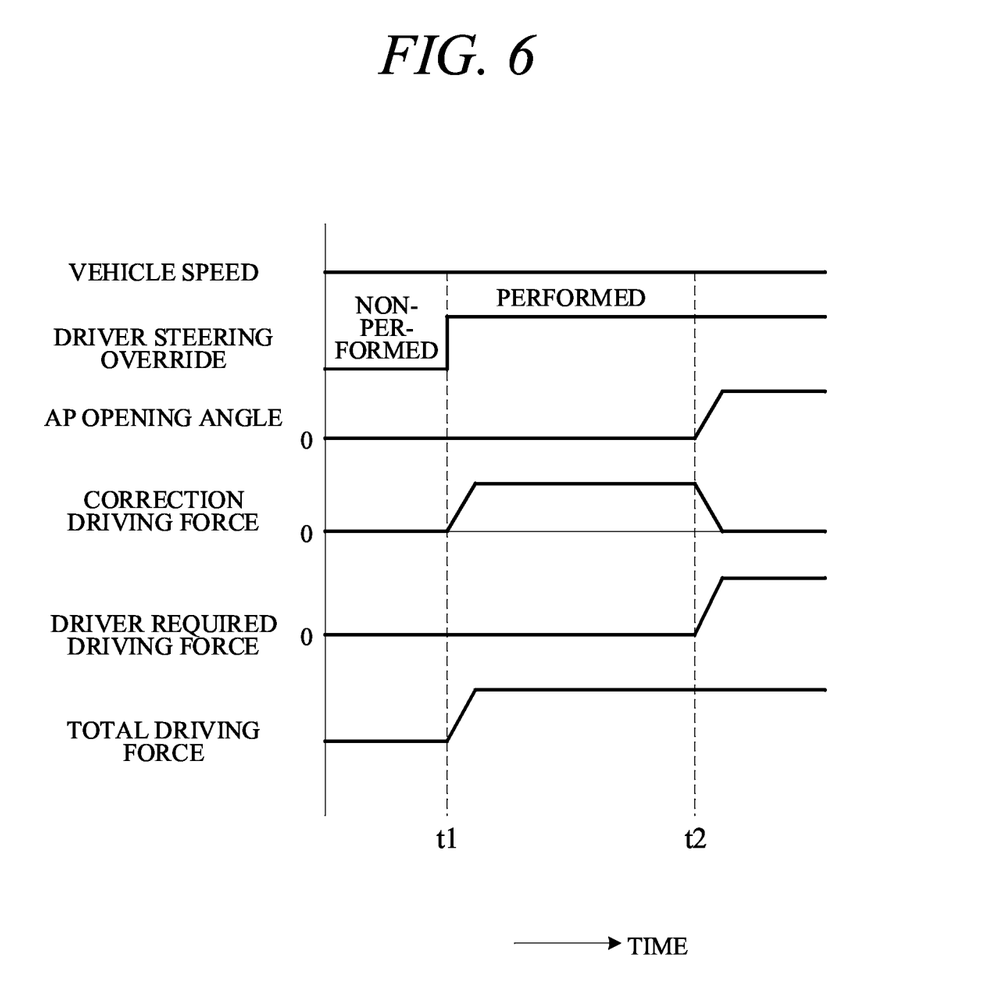
FIG. 6 is a time chart showing an example of actions performed by the vehicle control apparatus according to the embodiment of the invention.

FIG. 6 is a time chart showing an example of actions performed by the vehicle control apparatus 50 according to the present embodiment. FIG. 6 shows examples of time-course changes of vehicle speed, presence or absence of mode switching instruction in response to driver steering override, amount of accelerator pedal manipulation (AP opening angle), correction driving force, required driving force corresponding to accelerator pedal manipulation (driver required driving force), and total driving force (sum of correction driving force and driver required driving force). Characteristics indicating changes in driving force distribution are omitted from the drawings. Characteristics indicating driving force in self-drive mode are also omitted.

In the example of FIG. 6, the driver is assumed to perform a steering wheel manipulation during traveling in self-drive mode. When switching to manual drive mode is instructed in response to driver steering override at time t1, cornering resistance increases. However, at this time, correction driving force increases by increase of cornering resistance (S6). Therefore, since total driving force increases, vehicle speed stays constant. When the driver thereafter manipulates the accelerator pedal at time t2, drive mode shifts to manual drive mode, whereupon driver required driving force increases and correction driving force decreases (S7). Therefore, total driving force can be held constant and vehicle speed maintained steady until manual drive mode is established.

The present embodiment can achieve advantages and effects such as the following:

(1) The vehicle control apparatus 50 is adapted to control the vehicle 100 configured as shown in FIG. 1 to enable change of driving force distribution to the front wheels FW and rear wheels RW from the driving force generation unit 3 that generates travel driving force. The vehicle control apparatus 50 includes the determination unit 51 for determining whether a mode switching instruction has been input in response to driver steering override to instruct switching from self-driving capability enabled self-drive mode to self-driving capability disabled manual drive mode, and the distribution control unit 53 for controlling the driving force distribution mechanism 11 (driving force distribution actuator AC3) to control driving force distribution rate, i.e., a value of ratio of rear wheel RW driving force relative to front wheel FW driving force, to ⅓ (=25/75) during traveling in self-drive mode and to control driving force distribution rate to 1 (=50/50) when the determination unit 51 determines input of a mode switching instruction (FIG. 4).

Since such reduction of driving force distribution to the front wheels FW (increase of driving force distribution to the rear wheels RW) when mode switching is instructed in response to driver override steering helps to lower front wheel FW load factor, the vehicle 100 can corner more efficiently. Therefore, unnatural feeling experienced by the driver is mitigated because adverse effect of increased cornering resistance on cornering performance is minimized and increase of deceleration immediately after switching to manual drive mode is held down. And although distributing a high proportion of driving force to the front wheels FW when traveling on snow or similar would likely cause driving force operating point with respect to tire friction circle to deviate from the friction circle and make the vehicle 100 incapable of turning, driving force operating point is actually kept inside the friction circle and the vehicle 100 is able to corner easily because reduction of driving force distribution to the front wheels FW is limited to a driving force distribution rate of 1.

(2) The vehicle control apparatus 50 further includes the driving force control unit 54 (FIG. 4) responsive to determination by the determination unit 51 during traveling in self-drive mode that a mode switching instruction was input, for controlling the driving force generation unit 3 (throttle actuator AC1 and/or shift actuator AC2) so as to minimize decrease of vehicle speed. Therefore, switching to manual drive mode in response to driver steering override can be achieved while maintaining vehicle speed and causing little or no unnatural feeling to the driver.

(3) The vehicle control apparatus 50 further includes the accelerator manipulation sensor 32*a* and the brake manipulation sensor 32*b* (FIG. 4), respectively for detecting manipulation of the accelerator pedal and the brake pedal by the driver to instruct acceleration and deceleration of the vehicle 100. When the accelerator manipulation sensor 32*a* and the brake manipulation sensor 32*b* detect no manipulation of either the accelerator pedal or the brake pedal, the driving force control unit 54 responds to determination by the determination unit 51 during traveling in self-drive mode that a mode switching instruction has been input, by additionally controlling the throttle actuator AC1 and/or the shift actuator AC2 to maintain constant vehicle speed, and thereafter responds to detection of manipulation of the accelerator pedal or the brake pedal by controlling the throttle actuator AC1 and/or the shift actuator AC2 in proportion to the detected manipulation. Since control is performed to maintain constant vehicle speed in this manner so long as acceleration and deceleration is not instructed by a driver manipulation, the vehicle 100 can be controlled to behave in accordance with driver intention.

(4) The vehicle control apparatus 50 further includes the cornering resistance calculation unit 52 (FIG. 4) for calculating cornering resistance based on steering angle by driver steering. The driving force control unit 54 controls the throttle actuator AC1 and/or shift actuator AC2 in accordance with cornering resistance calculated by the cornering resistance calculation unit 52. Therefore, driving force for overcoming cornering resistance can be easily covered.

Various modifications of the present embodiment are possible. Some examples are explained in the following. In the above embodiment, the distribution control unit 53 controls the driving force distribution mechanism 11, so that driving force distribution rate defined as a value of ratio of rear wheel RW driving force to front wheel FW driving force is ⅓ (=25/75) as an example of a first distribution rate during traveling in self-drive mode, and thereafter it is 1 (50/50) as an example of a second distribution rate when it is determined by the determination unit 51 that mode switching instruction to manual drive mode has been input. However, as long as the second distribution rate is greater than the first distribution rate, values of the first and second distribution rates are not limited to the above values. Preferably, in order to prevent driving force operating point with respect to tire friction circle from deviating from the friction circle, the second distribution rate is set to a value not to exceed 1.0.

Although in the above embodiment whether switching to manual drive mode is instructed in response to driver steering override is determined based on signal from the steering reaction force sensor 32*c* serving as a steering angle detector, this determination can be also carried out based on signal from other sensor for detecting steering angle of the steering wheel 8. Therefore, a determination unit is not limited to the above configuration. Although in the above embodiment the driving force distribution mechanism 11 is configured by an electromagnetic clutch, a driving force distribution mechanism is not limited to the above configuration. In the above embodiment, manipulation of the accelerator pedal and manipulation of the brake pedal are detected by the accelerator manipulation sensor 32*a* and brake manipulation sensor 32*b*, respectively. However, an instruction member for instructing an acceleration and deceleration of a vehicle and an instruction detector for detecting a manipulation of the instruction member are not limited to the above configurations.

In the above embodiment, when it is determined by the determination unit 51 that switching instruction to manual drive mode has been input, the driving force control unit 54 controls the driving force generation unit 3 (throttle actuator AC1 and shift actuator AC2) so as to minimize decrease of vehicle speed. However, the vehicle control apparatus 50 may perform only change of driving force distribution with the driving force control unit 54 omitted. Therefore, the cornering resistance calculation unit 52 may be omitted. Although in the above embodiment the distribution control unit 53 controls the driving force distribution mechanism 11 so as to change torque distribution to front wheels and rear wheels, a distribution control unit is not limited to the above configuration. For example, in-wheels motors may be housed in four wheels respectively, and torque distribution of front wheels and rear wheels may be changed by controlling driving force of each of in-wheel motors.

The present invention can also be used as a vehicle control apparatus configured to control the vehicle 100 capable of changing a driving force distribution to front wheels FW and rear wheels RW from the driving force generation unit 3 generating a driving force.

The above embodiment can be combined as desired with one or more of the above modifications. The modifications can also be combined with one another.

According to the present invention, it is possible to reduce unnatural feeling to a driver when a mode switching instruction from self-drive mode to manual drive mode has been input by a driver steering override.

Above, while the present invention has been described with reference to the preferred embodiments thereof, it will be understood, by those skilled in the art, that various changes and modifications may be made thereto without departing from the scope of the appended claims.

What is claimed is:

1. A vehicle control apparatus controlling a vehicle with a self-driving function, comprising:
a driving force generation unit configured to generate a driving force used for traveling;
a driving force distribution mechanism configured to distribute the driving force from the driving force generation unit to a front wheel and a rear wheel;
an external sensor configured to detect an external circumstance of the vehicle; and
an electronic control unit having a microprocessor and a memory, wherein
the microprocessor is configured to perform:
generating an action plan including a target path of the vehicle based on the external circumstance detected by the external sensor;
controlling, in a self-drive mode enabling the self-drive function, an actuator for traveling of the vehicle based on the action plan generated by the generating so that the vehicle drives automatically;
determining whether a mode switching instruction from the self-drive mode to a manual drive mode disabling the self-drive function has been input in response to an override occurred by a driver's operation of steering; and
controlling the driving force distribution mechanism so that a driving force distribution rate defined as a value of a ratio of a driving force of the rear wheel relative to a driving force of the front wheel is a first distribution rate during driving in the self-drive mode, and thereafter controlling the driving force distribution mechanism so that the driving force distribution rate is a second distribution rate greater than the first distribution rate when it is determined that the mode switching instruction has been input.

2. The apparatus according to claim 1, wherein
the microprocessor is configured to further perform
controlling the driving force generation unit so as to minimize a decrease of a vehicle speed when it is determined that the mode switching instruction has been input during driving in the self-drive mode.

3. The apparatus according to claim 2, further comprising:
an instruction member configured to instruct an acceleration and deceleration of the vehicle in accordance with a manipulation by the driver; and
an instruction detector configured to detect a manipulation of the instruction member by the driver, wherein
the instruction member includes an accelerator pedal and a brake pedal,
the instruction detector is an accelerator manipulation sensor detecting a manipulation of the accelerator pedal and a brake manipulation sensor detecting a manipulation of the brake pedal, and
the microprocessor is configured to perform
the controlling including further controlling the driving force generation unit so as to keep the vehicle speed constant when it is determined that the mode switching instruction has been input during driving in the self-drive mode without the manipulation of the instruction member detected by the instruction detector, and thereafter controlling the driving force generation unit in accordance with the manipulation of the instruction member when the manipulation of the instruction member is detected by the instruction detector.

4. The apparatus according to claim 2, further comprising a steering angle detector configured to detect a steering angle in accordance with a steering of the driver, wherein
the microprocessor is configured to further perform
calculating a cornering resistance based on the steering angle detected by the steering angle detector, and
the controlling including controlling the driving force generation unit in accordance with the cornering resistance calculated in the calculating.

5. The apparatus according to claim 1, further comprising:
a steering actuator configured to apply a reaction force to be greater as an amount of a steering of the driver is greater; and
a reaction force detector configured to detect the reaction force applied by the steering actuator, wherein
the microprocessor is configured to perform
the determining including determining whether the mode switching instruction has been input based on the reaction force detected by the reaction force detector.

6. The apparatus according to claim 1, wherein
the first distribution rate is smaller than 1, and the second distribution rate is 1.

7. A vehicle control apparatus controlling a vehicle with a self-driving function, comprising:
a driving force generation unit configured to generate a driving force used for traveling;
a driving force distribution mechanism configured to distribute the driving force from the driving force generation unit to a front wheel and a rear wheel;
an external sensor configured to detect an external circumstance of the vehicle; and
an electronic control unit having a microprocessor and a memory, wherein
the microprocessor is configured to function as:
an action plan generation unit configured to generate an action plan including a target path of the vehicle based on the external circumstance detected by the external sensor;
a driving control unit configured to control, in a self-drive mode enabling the self-drive function, an actuator for traveling of the vehicle based on the action plan generated by the generating so that the vehicle drives automatically;
a determination unit configured to determine whether a mode switching instruction from the self-drive mode to a manual drive mode disabling the self-drive function has been input in response to an override occurred by a driver's operation of steering; and
a distribution control unit configured to control the driving force distribution mechanism so that a driving force distribution rate defined as a value of a ratio of a driving force of the rear wheel relative to a driving force of the front wheel is a first distribution rate during driving in the self-drive mode, and thereafter controlling the driving force distribution mechanism so that the driving force distribution rate is a second distribution rate greater than the first distribution rate when it is determined by the determination unit that the mode switching instruction has been input.

8. The apparatus according to claim 7, wherein
the microprocessor is configured to further function as a driving force control unit configured to control the driving force generation unit so as to minimize a decrease of a vehicle speed when it is determined by the determination unit that the mode switching instruction has been input during driving in the self-drive mode.

9. The apparatus according to claim 8, further comprising:
an instruction member configured to instruct an acceleration and deceleration of the vehicle in accordance with a manipulation by the driver; and
an instruction detector configured to detect a manipulation of the instruction member by the driver, wherein
the instruction member includes an accelerator pedal and a brake pedal,
the instruction detector is an accelerator manipulation sensor detecting a manipulation of the accelerator pedal and a brake manipulation sensor detecting a manipulation of the brake pedal, and
the driving force control unit is configured to further control the driving force generation unit so as to keep the vehicle speed constant when it is determined by the determination unit that the mode switching instruction has been input during driving in the self-drive mode without the manipulation of the instruction member detected by the instruction detector, and thereafter to control the driving force generation unit in accordance with the manipulation of the instruction member when the manipulation of the instruction member is detected by the instruction detector.

10. The apparatus according to claim 8, further comprising
a steering angle detector configured to detect a steering angle in accordance with a steering of the driver, wherein
the microprocessor is configured to further function as
a cornering resistance calculation unit configured to calculate a cornering resistance based on the steering angle detected by the steering angle detector, and
the driving force control unit is configured to control the driving force generation unit in accordance with the cornering resistance calculated by the cornering resistance calculation unit.

11. The apparatus according to claim 7, further comprising:
a steering actuator configured to apply a reaction force to be greater as an amount of a steering of the driver is greater; and
a reaction force detector configured to detect the reaction force applied by the steering actuator, wherein
the determination unit is configured to determine whether the mode switching instruction has been input based on the reaction force detected by the reaction force detector.

12. The apparatus according to claim 7, wherein
the first distribution rate is smaller than 1, and the second distribution rate is 1.

13. A vehicle control method configured to control a vehicle with a self-driving function, the vehicle including a driving force generation unit generating a driving force used for traveling, a driving force distribution mechanism distributing the driving force from the driving force generation unit to a front wheel and a rear wheel, and an external sensor configured to detect an external circumstance of the vehicle, the method comprising:
generating an action plan including a target path of the vehicle based on the external circumstance detected by the external sensor;
controlling, in a self-drive mode enabling the self-drive function, an actuator for traveling of the vehicle based on the action plan generated by the generating so that the vehicle drives automatically;
determining whether a mode switching instruction from the self-drive mode to a manual drive mode disabling the self-drive function has been input in response to an override occurred by a driver's operation of steering; and
controlling the driving force distribution mechanism so that a driving force distribution rate defined as a value of a ratio of a driving force of the rear wheel relative to a driving force of the front wheel is a first distribution rate during driving in the self-drive mode, and thereafter controlling the driving force distribution mechanism so that the driving force distribution rate is a second distribution rate greater than the first distribution rate when it is determined that the mode switching instruction has been input.

14. The method according to claim 13, further comprising
controlling the driving force generation unit so as to minimize a decrease of a vehicle speed when it is determined that the mode switching instruction has been input during driving in the self-drive mode.

15. The method according to claim 14, further comprising:
instructing an acceleration and deceleration of the vehicle in accordance with a manipulation by the driver; and
detecting the manipulation by the driver, wherein
the controlling includes further controlling the driving force generation unit so as to keep the vehicle speed constant when it is determined that the mode switching instruction has been input during driving in the self-drive mode without the manipulation detected in the detecting, and thereafter controlling the driving force generation unit in accordance with the manipulation by the driver when the manipulation is detected in the detecting.

16. The method according to claim 14, further comprising
detecting a steering angle in accordance with a steering of the driver, and
calculating a cornering resistance based on the steering angle detected in the detecting, wherein
the controlling includes controlling the driving force generation unit in accordance with the cornering resistance calculated in the calculating.

17. The method according to claim 13, wherein the vehicle further includes a steering actuator applying a reaction force to be greater as an amount of a steering of a driver is greater, the method further comprising
detecting the reaction force applied by the steering actuator, wherein
the determining includes determining whether the mode switching instruction has been input based on the reaction force detected in the detecting.

18. The method according to claim 13, wherein
the first distribution rate is smaller than 1, and the second distribution rate is 1.

19. The apparatus according to claim 4, wherein
the microprocessor is configured to perform
the controlling including controlling the driving force generation unit so that the driving force is increased by an amount proportional to the cornering resistance calculated in the calculating.

20. The apparatus according to claim 5, wherein
the microprocessor is configured to perform the determining including determining the mode switching instruction has been input when an angle of the steering corresponding to the reaction force detected by the reaction force detector is equal to or greater than a predetermined value.

* * * * *